United States Patent
Puon et al.

(10) Patent No.: US 7,349,327 B2
(45) Date of Patent: Mar. 25, 2008

(54) SYSTEM AND METHOD FOR REMOTELY UPDATING A NETWORK DEVICE

(75) Inventors: Roberto Puon, Madison, AL (US); David Glenn Perkinson, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 903 days.

(21) Appl. No.: 10/651,331

(22) Filed: Aug. 28, 2003

(65) Prior Publication Data
US 2005/0047326 A1 Mar. 3, 2005

(51) Int. Cl.
*G06F 15/771* (2006.01)
*G06F 11/00* (2006.01)
*H04L 12/28* (2006.01)

(52) U.S. Cl. .......................... 370/216; 709/221; 713/2

(58) Field of Classification Search ........ 370/216–217, 370/219–220, 254, 401–404; 709/220–222
See application file for complete search history.

(56) References Cited

U.S. PATENT DOCUMENTS

| | | | |
|---|---|---|---|
| 5,535,336 A | 7/1996 | Smith et al. | |
| 5,650,994 A | 7/1997 | Daley | |
| 5,708,656 A | 1/1998 | Noneman et al. | |
| 5,870,667 A | 2/1999 | Globuschutz | |
| 6,069,944 A | 5/2000 | Cretch | |
| 6,122,362 A | 9/2000 | Smith et al. | |
| 6,243,759 B1 | 6/2001 | Boden et al. | |
| 6,330,586 B1 | 12/2001 | Yates et al. | |
| 6,345,294 B1 | 2/2002 | O'Toole et al. | |
| 6,360,260 B1 | 3/2002 | Compliment et al. | |
| 6,385,648 B1 | 5/2002 | Philippou et al. | |
| 6,473,788 B1 | 10/2002 | Kim et al. | |
| 6,535,924 B1 | 3/2003 | Kwok et al. | |
| 6,738,826 B1 * | 5/2004 | Moberg et al. | 709/242 |
| 6,741,683 B1 * | 5/2004 | Shelton et al. | 379/101.01 |
| 6,865,591 B1 * | 3/2005 | Garg et al. | 709/201 |
| 6,950,878 B2 * | 9/2005 | Kwok et al. | 709/242 |

OTHER PUBLICATIONS

Thomas et al., U.S. Appl. No. 10/191,480, "System and Method for Provisioning Network Access Devices", Jul. 9, 2002.

* cited by examiner

*Primary Examiner*—Chau Nguyen
*Assistant Examiner*—Marcus R Smith
(74) *Attorney, Agent, or Firm*—Thomas, Kayden, Horstemeyer & Risley, L.L.P.

(57) ABSTRACT

A router in one embodiment of the present disclosure has first router logic and boot logic. The first router logic is configured to operate the router, and the boot logic is configured to receive updated router logic from a network and to perform a first reboot. The boot logic is further configured to initialize deactivation of the first router logic and initialize activation of the updated router logic during the first reboot such that a plurality of functions for the router are enabled during execution of the updated router logic. The boot logic is also configured to perform, in response to an error during execution of the updated router logic, a second reboot such that at least one of the functions is disabled.

27 Claims, 6 Drawing Sheets

SYSTEM AND METHOD FOR REMOTELY UPDATING A NETWORK DEVICE

BACKGROUND OF THE INVENTION

RELATED ART

A router generally refers to a device that forwards or routes data packets along a network. "Data packet" is a term used in the context of packet-switching networks to refer to a transmission unit of fixed size that generally consists of binary digits representing both data and a header containing an identification number, source and destination addresses, and sometimes error-control data.

Routers can be employed in a single network to link a plurality of computers via a mesh. The router transmits messages from one computer in the network to another via the most efficient route available. In addition, a router can be employed to connect networks together. In this regard, a router commonly connects a local area network (LAN) and a wide area network (WAN), two LANs, or a LAN and its Internet service provider (ISP) network. Routers are usually located at gateways, i.e., those nodes where two or more networks connect.

A router typically uses the header of a data packet and configuration data stored in the router to determine the best path for forwarding the packet. Note that "configuration data" refers to a set of data that is resident on the router and provides information relating to a plurality of optional paths that the router may use to forward the data packet to another network location. Such configuration data may provide information, such as, for example, which particular connections and/or hardware interfaces lead to a particular group of internet protocol (IP) addresses, priority rules related to the various interfaces, and rules for handling both routine and special cases of data packets. In addition, a router uses protocols, such as, for example, Internet control message protocol (ICMP), to communicate with other routers and configure the best route between any two hosts, i.e., an origination host and a destination host.

A router typically comprises router logic, which controls the operation of the router. During the course of the life of the router, the router logic is oftentimes updated with newer versions that implement new or improved functionality. A new version of the router logic may be transmitted via a connection to the router, and the process of updating the logic currently being executed can occur through an automated process. For clarity, the router logic being executed prior to an update is hereinafter referred to as the "original router logic" and the router logic currently being implemented via the update is hereinafter referred to as the "updated router logic."

Typically, the router receives the updated router logic via a network connection from an operator site. The operator site may include, for example, a computer, which is operated by a user. When the router receives data indicative of the updated router logic, the router typically is configured to perform a checksum procedure on the data received.

A checksum procedure is an error detection procedure, whereby a value representative of a data block is appended to the data block. Such value can be determined by sequentially combining all the bytes of data with a series of arithmetic or logical operations. After the data is transmitted or stored, a checksum is performed in the same way using the transmitted data block. If the results of the checksums do not match, an error has occurred, and the data should be re-transmitted and stored again.

After the router has performed the checksum procedure, the router can choose to execute the logic if the checksum procedure passes, i.e., no error is detected when performing the checksum procedure. However, there are other types of errors that the checksum procedure may be unable to detect. For example, even though the values obtained in the checksum procedure do not indicate a faulty transmission, the router logic may nonetheless otherwise fail upon execution for other reasons, for example, there may be an incompatibility issue with respect to the hardware being employed by the router and the updated router logic.

If such an error occurs at runtime, the router may be inoperable until an operator can physically perform maintenance at the remote site of the router. Until the operator fixes the inoperable portions of the router, network traffic may be unable to use the router for forwarding packets through the network. Further, if new configuration data is implemented on the router, the new configuration data may also cause errors upon reboot.

SUMMARY OF THE INVENTION

Embodiments of the present invention pertain to router systems and methods that enable remote updating of a router and automatic rebooting if an operational failure occurs.

One embodiment of the present disclosure pertains to a router comprising first router logic configured to operate the router and boot logic configured to initialize deactivation of the first router logic and initialize activation of the updated router logic, if the updated router logic experiences an error during execution.

Another embodiment of the present disclosure further encompasses a router update method comprising the steps of receiving updated router logic via a communication interface; deactivating first router logic currently being executed; rebooting the router; activating the updated router logic in conjunction with first configuration data in response to the receiving step; activating the first router logic, in response to the rebooting step, in conjunction with the first configuration data, if the updated router logic experiences a first error; and activating the updated router logic in conjunction with fail-safe configuration data, in response to the rebooting step, if the first router logic experiences a second error with the first configuration data.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the figures.

DETAILED DESCRIPTION

Generally, the present disclosure relates to systems and methods for enabling network routers to be remotely updated. In one exemplary embodiment, new router logic for controlling the operation of a router within a network is remotely downloaded over the network to the router. The router then automatically reboots in alternative operating modes in accordance with the operational performance of new router logic.

Figure 1:
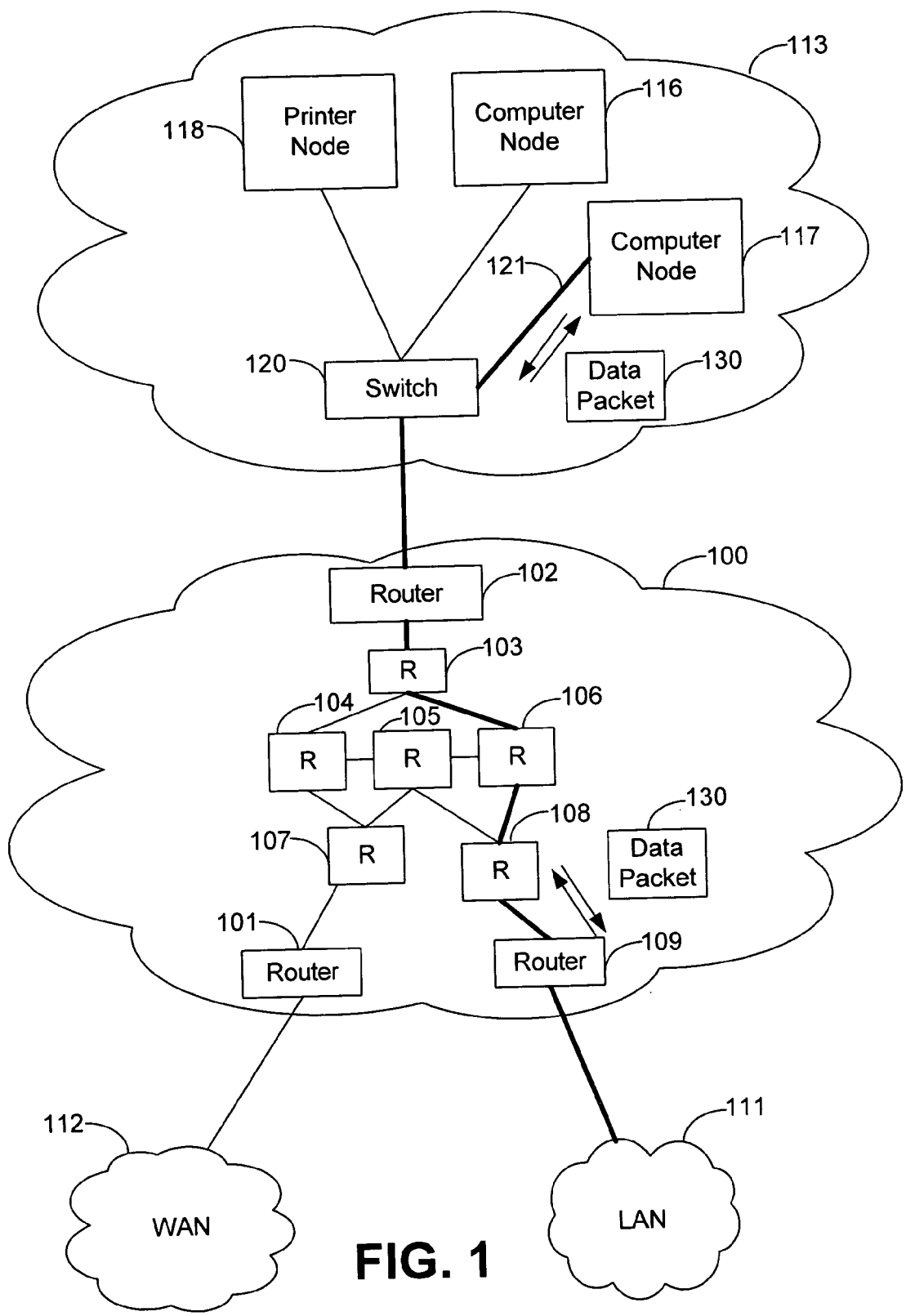
FIG. 1 is a diagram illustrating a network configuration.

FIG. 1 illustrates network 100 comprising a plurality of routers 101-109. Each of the plurality of routers 101-109 comprises a link in the network 100. In addition, for illustrative purposes, router 109 serves as a link between LAN 111 and router 108, router 101 serves as a link between WAN 112 and router 107, and router 102 serves as a link between LAN 113 and router 103. As shown by FIG. 1, LAN 113 can comprise, for example, computer nodes 116 and 117, printer node 118, and switch 120.

If a user (not shown) of computer node 117 desires to send a message (e.g., an email) to a user located on LAN 111, the message is transmitted, in the form of one or more data packets 130 via connection 121 to switch 120. Note that a switch typically performs functions similar to that of a router, i.e., the switch 120, in accordance with a header in the data packet 130 defining the email being transmitted, determines where to send the data packet 130. In the instant example, the switch 120 chooses to transmit the email to router 102 for forwarding via a transmission route comprising a subset of the routers 103-108 to the LAN 111. Such route, which is determined incrementally per router, follows a path from router 102 to router 103, from router 103 to router 106, from router 106 to router 108, from router 108 to router 109, and then to destination device (not shown) within LAN 111

Figure 2:
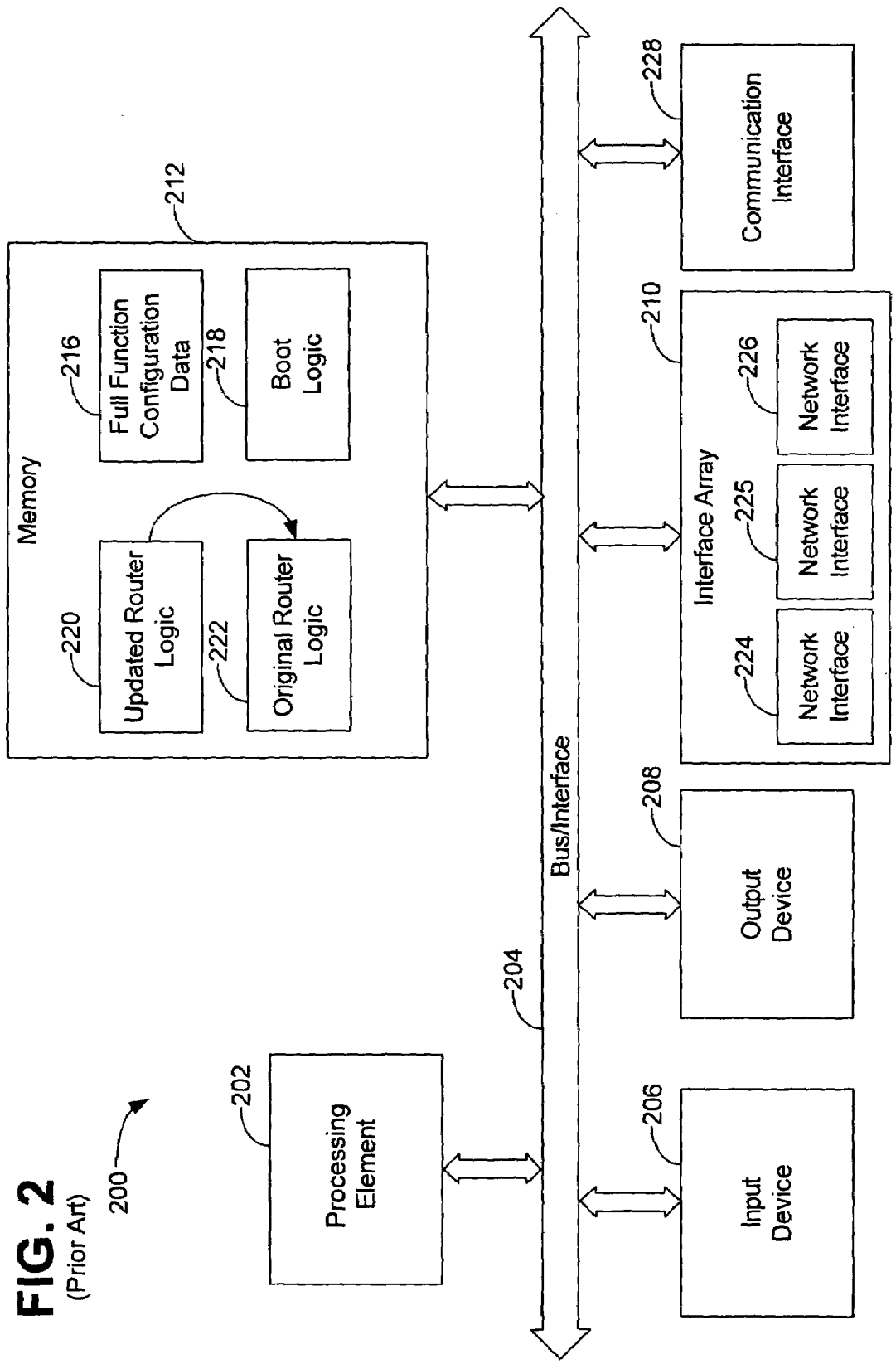
FIG. 2 is a block diagram illustrating a conventional router.

A conventional router 200 is depicted in FIG. 2 and comprises processing element 202, input device 206, output device 208, interface array 210, communication interface 228, and memory 212. The communication interface 228 may comprise, for example, a dial-up modem or any other type of communication device. Memory 212 comprises original router logic 222 and updated router logic 220. Memory 212 further comprises configuration data 216 and boot logic 218. The interface array 210 preferably comprises a plurality of network interfaces 224-226, each of which can comprise a network connector, such as, for example, an integrated services digital network (ISDN) connector, a T-1 connector, a T-3 connector, or any other type of connector known or future-developed.

In the conventional router 200 of FIG. 2, original router logic 222 controls operation of the router 200. In this regard, original router logic 220 receives data packets 130 (FIG. 1) via one of the plurality of interfaces 224-226 from another component (e.g., router) of a network 100 (FIG. 1). The original router logic 222 parses the data packets 130 and extracts relevant header data contained within the data packets to determine, for example, the size of the data for use in determining the integrity of the received data packet, the destination address, e.g., the internet protocol address (IP address) of the destination of the data packet, type of data, e.g., floating point data, and/or comments.

Further, the original router logic 222 may receive updated router logic 220 via one of the interfaces 224-226 from the network 100 (FIG. 1). When this occurs, the boot logic 218 of the conventional router 200 performs a test, for example a checksum test, on the updated router logic 220 to determine its integrity. For example, the boot logic 218 may determine a value indicative of the size and/or content of the updated router logic 220. The boot logic 218 may then compare the determined value to a value appended to the updated router logic 220, which was preferably determined using a converse procedure to that used by the boot logic 218. If the value determined and the value appended does not match, then the boot logic 218 does not initialize activation the updated router logic 222 on the router 200. Further, if the boot logic 218 initialize activation of the updated router logic 220 and there is an error during execution of the updated router logic 220, typically the router 200 will fail. In such a situation, a technician may manually interact with the router 200 via the input device 206 in an effort to correct the error condition.

Note that full-function configuration data 216 comprises a plurality of data values indicative of information relative to the receipt, the processing, and the forwarding of data packets over a network 100 (FIG. 1). In this regard, configuration data 216 may comprise, for example, initialization parameters related to an interface 224-226. Such data 216 may comprise the type of interface, e.g., ISDN, T1, and/or T3, or the maximum and/or minimum baud rate for the interface. In addition, full-function configuration data 216 may comprise routing information related to IP address sets. For example, the configuration data 216 may comprise a set of IP addresses that may be used in order to transmit data to a particular IP address. Further, note that in relation to the communication interface 228, such configuration data 216 may comprise data that is used to activate the communication interface 228 and place such communication interface 228 in answer mode.

The information defined by the full-function configuration data 216 typically comprises data values that are entered manually by a user. Such user can enter the values of the full-function configuration data 216 via the input device 206 through a textual representation of the data to be displayed to output device 208. In addition, an automated process (not shown) may create the full-function configuration data 216, whereby the full-function configuration data 216 is created electronically. The configuration data 216 usually reflect a user's preferences and may correspond to the type of hardware available for use by the router 200.

Figure 3:
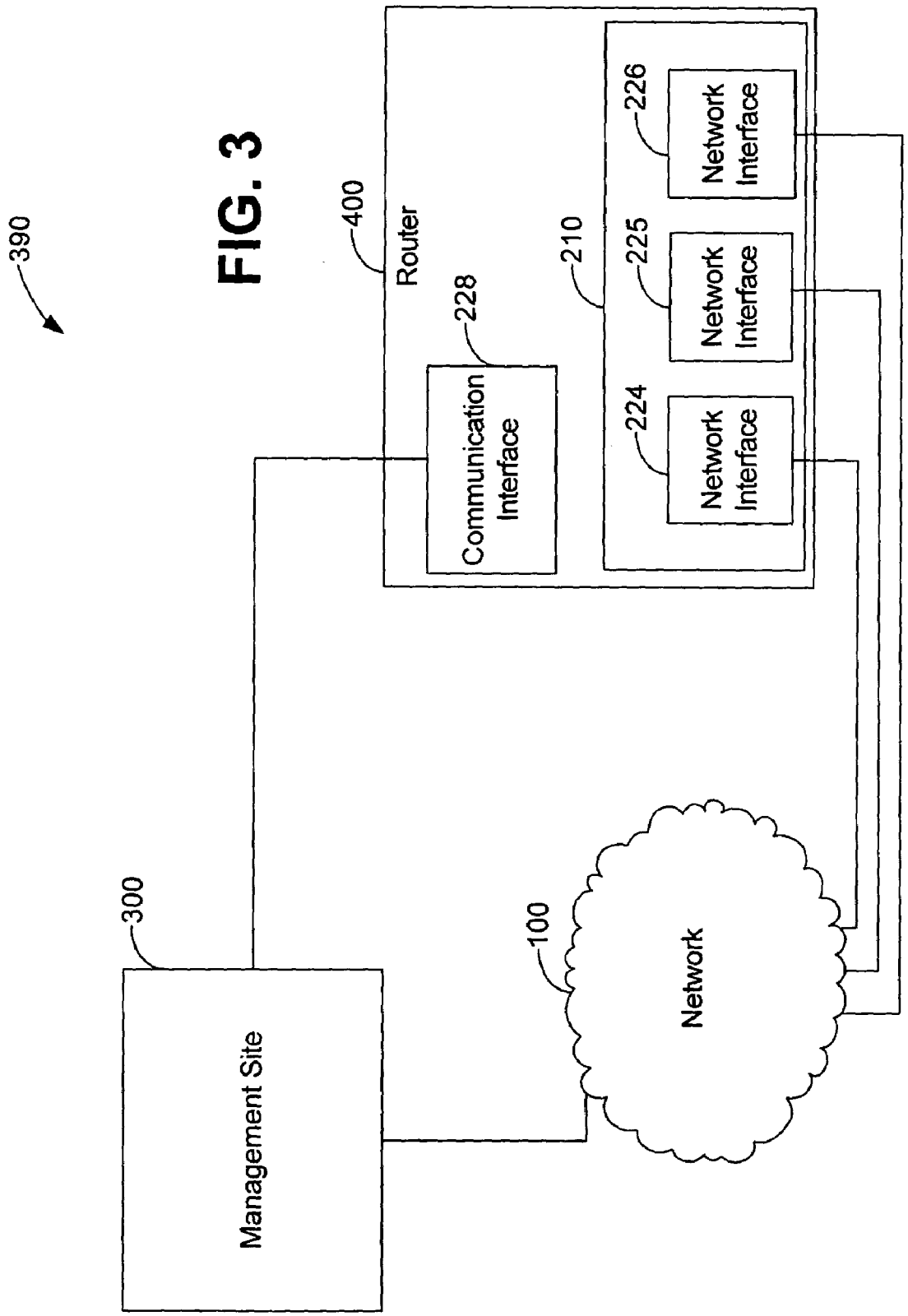
FIG. 3 is a block diagram illustrating an exemplary router system of the present disclosure.

With reference to FIG. 3, a network router system 390 in accordance with an exemplary embodiment of the current disclosure generally comprises a router 400 and a management station 300, which are connected via one or more network 100. The management site 300 can comprise input/output devices (not shown) for remote management of the router 400 remotely. The router 400 can be connected to the management site 300 via one or more of the network interfaces 224-226. In addition, the router 400 can be connected to the operator site 300 via a communication interface 228, for example a modem.

The router 400 is preferably configured to receive information updates, e.g., logic updates, via the network 100 through interfaces 224-226. In the event that the router 400 encounters an operational failure upon execution of any new information received, then the router 400 is preferably configured to re-boot with various router logic implementations using a variety of configurations prior to needing intervention from an operator locally. In this regard, the router 400 is remotely managed, which avoids the time-consuming and inefficient task of sending a technician to service the router locally. However, in the event that such intervention is desired, the router 400 is configured to initialize the communication interface 228 to enable communication between the management site 300 and the router 400. Thus, an operator (not shown) can access the router 400 via the communication interface 228. Note that such access may be made either manually by an operator or an automated process may make it. For example, an automated process (not shown) may be executed at the management site 300 and perform diagnostic testing via the communication interface 228. Upon access either by a user or an automated process, the router 400 can be rebooted.

Figure 4:
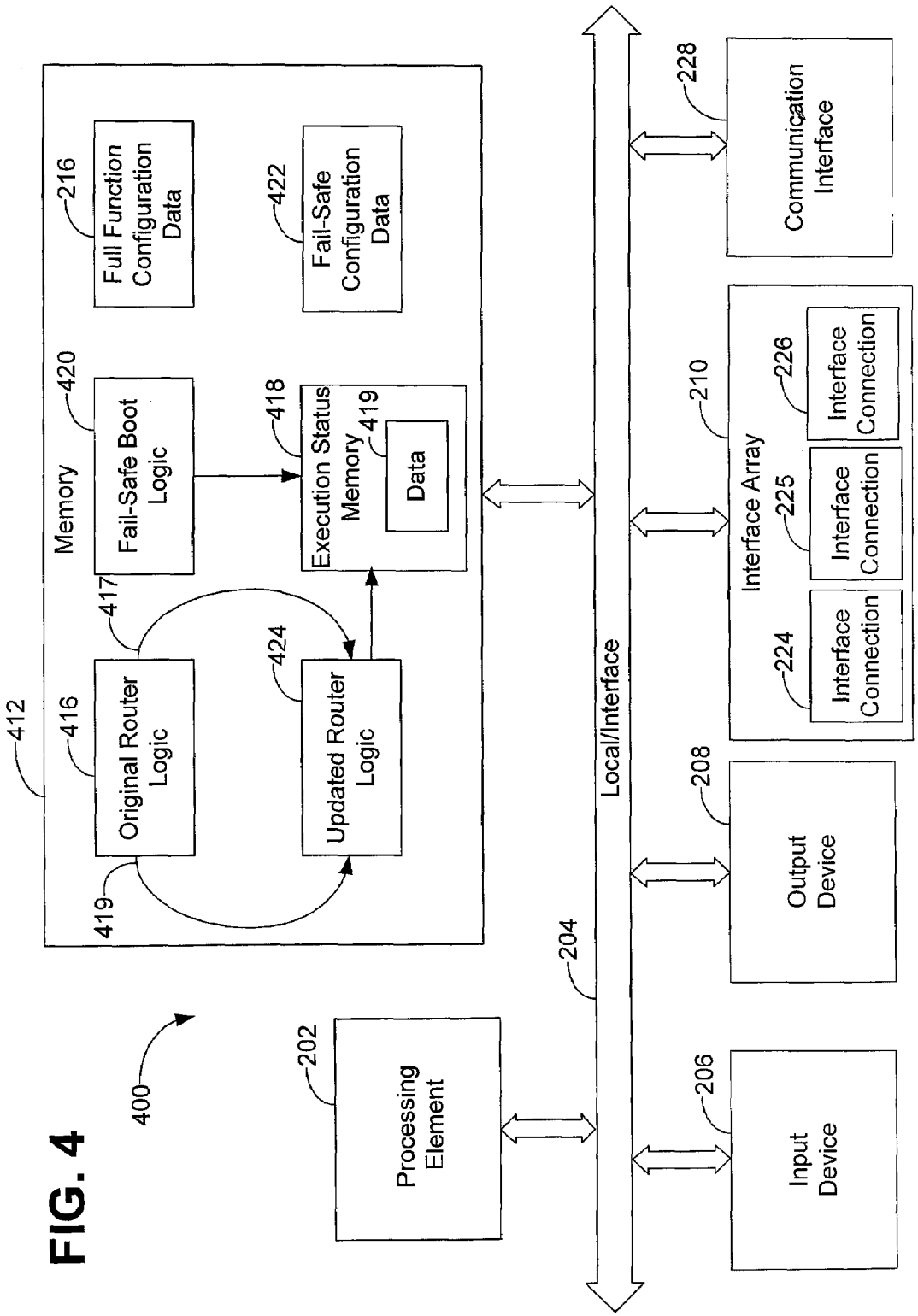
FIG. 4 is a block diagram illustrating an exemplary router depicted in FIG. 3 connected via a network to an operator site.

An exemplary view of the router 400 is depicted in FIG. 4 and generally comprises one or more system processing elements 202, such as a digital signal processor (DSP) or a central processing unit (CPU), that communicate to and drive the other elements within the router 400 via a local interface 204, which can include one or more buses. In addition, the router system 400 preferably comprises an input device 206, an output device 208, an interface array 210, a communication interface 228, and memory 412. Memory 412 further comprises original router logic 416 and updated router logic 424. As will be described in more detail herein, if errors occur during execution of the updated router logic 424, the original router logic 416 is used to run router 400 in lieu of the updated router logic 424.

In addition, memory 412 preferably comprises full-function configuration data 216, fail-safe configuration data 422, execution status memory 418, and fail-safe boot logic 420. As described herein, full-function configuration data 216 comprises data used by the router 400 in forwarding a data packet 130 (FIG. 1) via the network 100 (FIG. 1) to its destination, and such destination is preferably indicated by a data value stored in the header for the data packet 130. Further, the full-function configuration data 216 preferably comprises data values indicating a set of interface connection initialization parameters, for example the type of connection and the data rate for the connection. Further, configuration data 216 may comprise data values indicative of association of a set of forwarding IP addresses to be used by a particular interface 224-226.

Fail-safe configuration data 422 is a set of configuration data that has been tested with a router's current hardware configuration. Such testing has been effectuated by running the current hardware configuration with the fail-safe configuration data 422. Thus, the fail-safe configuration data 422 has been proven to provide minimal functionality to the router 400. In this regard, the fail-safe configuration data 422 refers to a set of data that prescribes minimal operational parameters that are preferably used when the router 400 becomes inoperable while using other configuration data, such as, for example, full-function configuration data 216. Such minimal operational parameters may include, for example, initialization data related to the communication interface 228. Preferably, the fail-safe configuration data 422 enables less function than the full-function configuration data 216. For example, the fail-safe configuration data 422 preferably enables the management station 300 (FIG. 3) to access the router 400 remotely and provide needed maintenance or software adjustments when the router 400 has encountered an operational failure. However, the fail-safe configuration data 422 may not enable other functions, such as routing data packets, for example.

The fail-safe boot logic 420 preferably refers to an executable program, which may be used to reboot the router 400 when the router becomes inoperable or experiences an operational failure. It may be desirable to reboot router 400 for various reasons, including the router 400 may get locked in an infinite loop and continue trying to execute updated router logic 424, even though the updated router logic 424 is not effective. Further, a user of management station 300 may desire to reboot the router 400 with a new version of the updated router logic 424. In such a case, the router 400 is preferably booted to implement such change.

As illustrated by way of example in FIG. 4, the fail-safe boot logic 420 in accordance with an exemplary embodiment of the present disclosure is implemented in software and stored in memory 412. However, in other embodiments the fail-safe boot logic 420 may be implemented in hardware or a combination of hardware and software.

The fail-safe boot logic 420, when implemented in software, can be stored and transported on any computer-readable medium for use by or in connection with an instruction execution system, apparatus, or device, such as a computer-based system, processor-containing system, or other system that can fetch and execute instructions. In the context of this document, a computer-readable medium can be any means that can contain, store, communicate, propagate, or transport a program for use by or in connection with the instruction execution system, apparatus, or device. The computer-readable medium can be, for example but not limited to, an electronic, magnetic, optical, electromagnetic, infrared, or semiconductor system apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the fail-safe boot logic 420 may be magnetically stored and transported on a conventional portable computer diskette.

As previously indicated hereinabove, the router 400 may receive the updated router logic 424 via one of the network interfaces 224-226. Note that the interface array 210 is illustrated with three network interfaces 224-226. However, the number and/or type of network interfaces are not pivotal to the present disclosure and may vary for different embodiments.

When received by the router 400, the updated router logic 424 is stored in memory 412. The updated router logic 424 is preferably received while an older version of router logic 424, referred to as "original router logic," is currently being executed. Such receipt of the updated router logic 424 is preferably transparent to the operation of the router 400. In this regard, the original router logic 416 continues to operate normally (e.g., receive and forward data packets) when the updated router logic 424 is received.

Upon receipt of the updated router logic 424, the fail-safe boot logic 420 initialize deactivation of the original router logic 416 and identifies this original router logic 416 as a backup router logic (e.g., indicates that the original router logic 424 is to be used only in the event of an error, for example an operational failure associated with the updated router logic 424. The fail-safe boot logic 420 also installs and initializes activation of the updated router logic 424. The process of installing and activating the updated router logic 424 can be any type of process known in the art or future-developed. For example, the fail-safe boot logic 420 may copy the updated router logic 424 to an active directory in a file system and change the updated router logic descriptors to indicate that it is executable. Another embodiment may set a flag located in a file of a file directory, indicating which router logic 416 or 424 is currently to be executed.

After the updated router logic 424 is installed and activated, the fail-safe boot logic 420 boots the router system 400, and the router system 400 operates with the configuration data 216. As noted herein, the full-function configuration data 216 preferably enables the router system 400 to operate at full function capacity, e.g., each of the interface connectors are active. In this regard, the full-function configuration data 216 comprises data that enables each of the network interfaces 224-226. Note that this configuration data 216 may also configure the communication interface 228, as well.

During execution, the updated router logic 424 preferably stores, in execution status memory 418, data 419 that may be employed in determining which router logic, e.g., updated router logic 424 or original router logic 416, is currently active and any runtime errors that may be associated with its execution. In addition, the updated router logic 424 may store other data related the active router logic, the inactive router logic, the full-function configuration data 216, and/or the fail-safe configuration data 422.

Therefore, if during the booting process initiated by the fail-safe boot logic 420 the updated router logic 424 experiences a runtime error and such data is written to the execution status memory 418, then the fail-safe boot logic 420 can reboot the router 400 based upon which router logic was previously active at the time of the runtime error.

Initially, the fail-safe boot logic 420 preferably attempts to initialize execution of the updated router logic 424 and initially, the router logic 424 operates with the full-function configuration data 216. If the boot is successful, then the router system 400 is operating with full-function capacity as provided by the configuration data 216, and the router system 400 is operating exhibiting the updated functionality provided for in the updated router logic 424. If the boot is not successful and the updated router logic 424 produces an error upon execution, then the updated router logic 424 preferably stores data, in execution status memory 418, that identifies the router logic being executed as the updated router logic 424 and stores data that identifies that the updated router logic 424 was activated along with the full-function configuration data 216 when the error was produced. In addition, the updated router logic 424 preferably stores data in execution status memory 418 that indicates that an error occurred during execution and/or the type of error that occurred during execution.

When the fail-safe boot logic 420 reboots the router 400, the fail-safe boot logic 420 analyzes the data 419 stored in the execution status memory 418. Thus, if the updated router logic 424 produced an error in execution with the full-function configuration data 216, then the boot logic 424 preferably attempts to reboot the router in an alternative mode that may not produce an error during execution. In this regard, if the fail-safe boot logic 420 identifies that the previous failure during execution occurred when the updated router logic 424 was active, then in attempting to boot the router 400, the fail-safe boot logic 420 will preferably try activating the original router logic 416. Upon execution, the original router logic 416 determines whether to operate the original router logic 416 with the full-function configuration data 216 or the fail-safe configuration data 422 by analyzing the execution status memory 418. In this regard, the fail-safe boot logic 420 and/or the original router logic 416 or the updated router logic 424, depending upon which router logic 416 or 424 is executing, can store in the execution status memory 418 a data value indicating which configuration data 216 or 422 was used in operation during a previous execution of router logic 416 or 424.

If such boot is successful, then the router system 400 operates with the original router logic 416 and the configuration data 216. Thus, the routing system 400 does not retain the newly implemented functionality that may have been present in the updated router logic 424, but it does initialize activation of the original router logic 416, which was previously being executed prior to receipt of the updated router logic 424. In this regard, the updated functionality is not exhibited, but the router system is operating with full-function capabilities in accordance with the configuration data 216.

Upon reboot, if such execution status memory 418 indicates that the previous failed execution occurred when the original router logic 416 was active with the full-function configuration data 216, then the fail-safe boot logic 420 preferably attempts to boot the router 400 with the updated router logic 424, and the updated router logic 424 attempts to operate in conjunction with the fail-safe configuration data 422.

As noted herein, the fail-safe configuration data 422 preferably enables a reduced set of functionality, but allows the router system 400 to communicate with the management site 300 (FIG. 3). In this regard, the fail-safe configuration data 422 preferably comprises, at a minimum, data indicative of initialization parameters for the communication interface 228. Specifically, it is preferable that the modem 228 be initialized in answer mode, as described with reference to FIG. 3.

If boot of the updated router logic 424 operating with the fail-safe configuration data 422 is successful, then the router system 400 operates in accordance with the updated router logic 424, i.e., if the update router logic 424 enables new functionality, such new functionality is exhibited in the router 400. However, it will be currently operating in the fail-safe configuration mode. In such a mode, the router system 400 may not exhibit the functionality necessary to fully operate as desired. For example, one or more of the interface connections 224-226 may not be active or initialized. However, an operator may access the router 400 manually via the communication interface 228 and remotely remedy, via manual inputs, any defects that may exist in the configuration data 216 or the updated router logic 424 that may be related to the dysfunctional router 400.

If the fail-safe boot logic 420 is unable to boot the router 400 with the updated router logic 42 and/or the router logic 424 is unable to operate in conjunction with the fail-safe configuration data 422, the fail-safe boot logic 420 may then, in accordance with the status memory 418, attempt to boot the original router logic 416, and the original router logic 416 may operate with the configuration data 216 with the fail-safe configuration data 422. In this regard, if the boot is successful, then the router 400 is currently operating with existing functionality. However, it is not fully functional in that it is only operating in fail-safe mode, as described herein.

Figure 5:
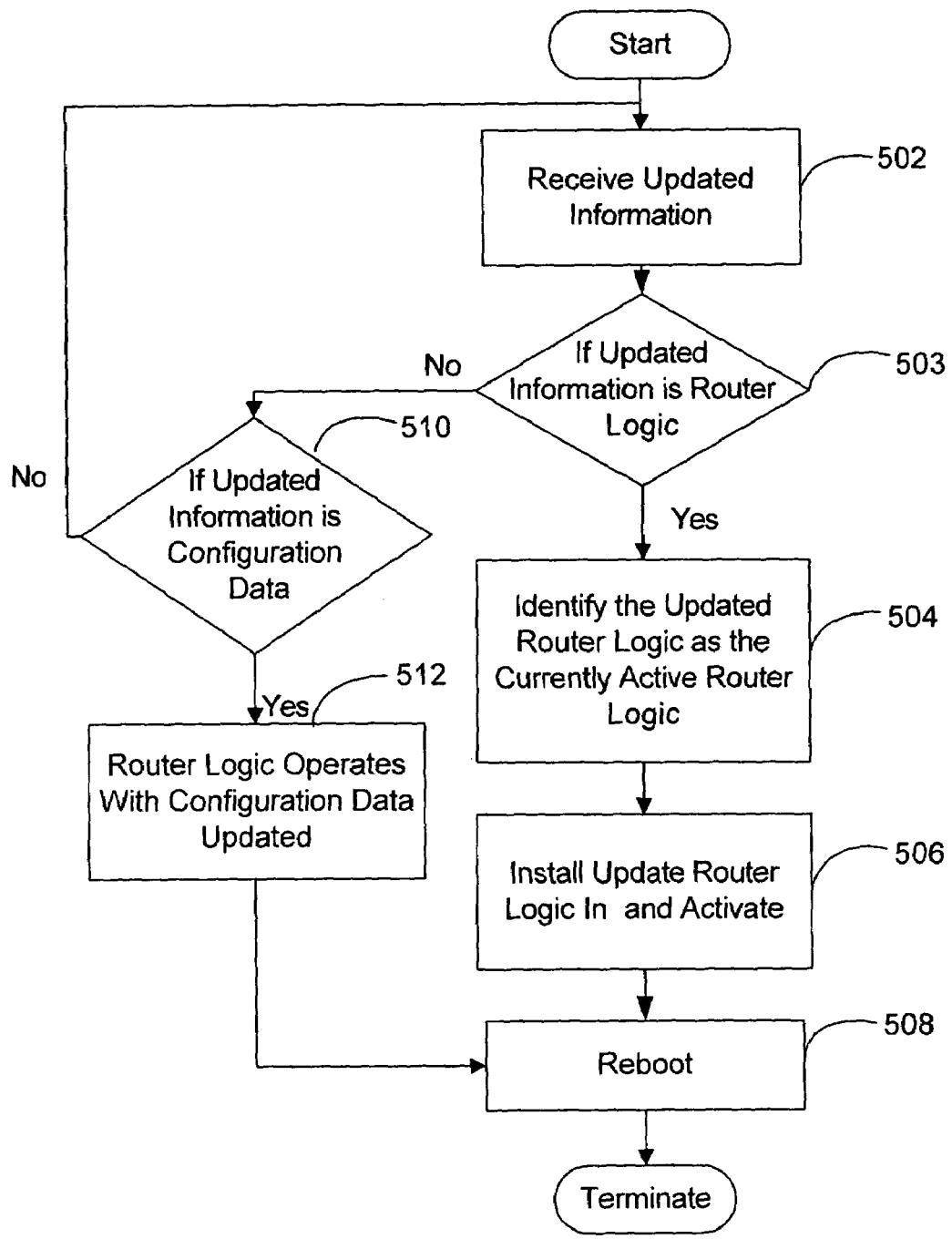
FIG. 5 is a flowchart illustrating an exemplary architecture and functionality of a router system, such as is depicted in FIG. 3.

An exemplary architecture and functionality of the fail-safe boot logic 420 in accordance with an exemplary embodiment of the present disclosure is now described with reference to FIG. 5.

As indicated in step 502, a router 400 (FIG. 4) receives update information. Preferably, such receipt is the result of a download from the management site 300. The update information can be the updated router logic 424 (FIG. 4). In other embodiments, the update information can comprise an update to the configuration data 416 (FIG. 4), an update to the fail-safe full-function configuration data 422 (FIG. 4) and/or an update to the updated router logic 424.

If the updated information is updated router logic 424, as indicated in step 503, then the fail-safe boot logic 420 identifies the updated router logic 424 as the active and installed router logic, as indicated in step 504. The fail-safe boot logic 420 then installs and initializes activation of the updated router logic 424, as indicated in step 506. The fail-safe boot logic 420 then reboots as indicated in step 508. Reboot in accordance with an exemplary router method of the present disclosure is described in more detail with reference to the flowchart 600 depicted in FIG. 6.

As indicated herein, the updated information received in step 502 of (FIG. 5) may comprise configuration data 416 or 422, as well. As indicated in step 503, if the updated information is not updated router logic 424, the boot logic 420 may determine whether the updated information is updated configuration data, as indicated in step 510. If it is updated configuration data, as indicated in step 510, then the router logic 416 and/or 424 operates with the configuration data 216 or 422, as indicated in step 512. The router 400 then waits for receipt of updated information at step 502.

Figure 6:
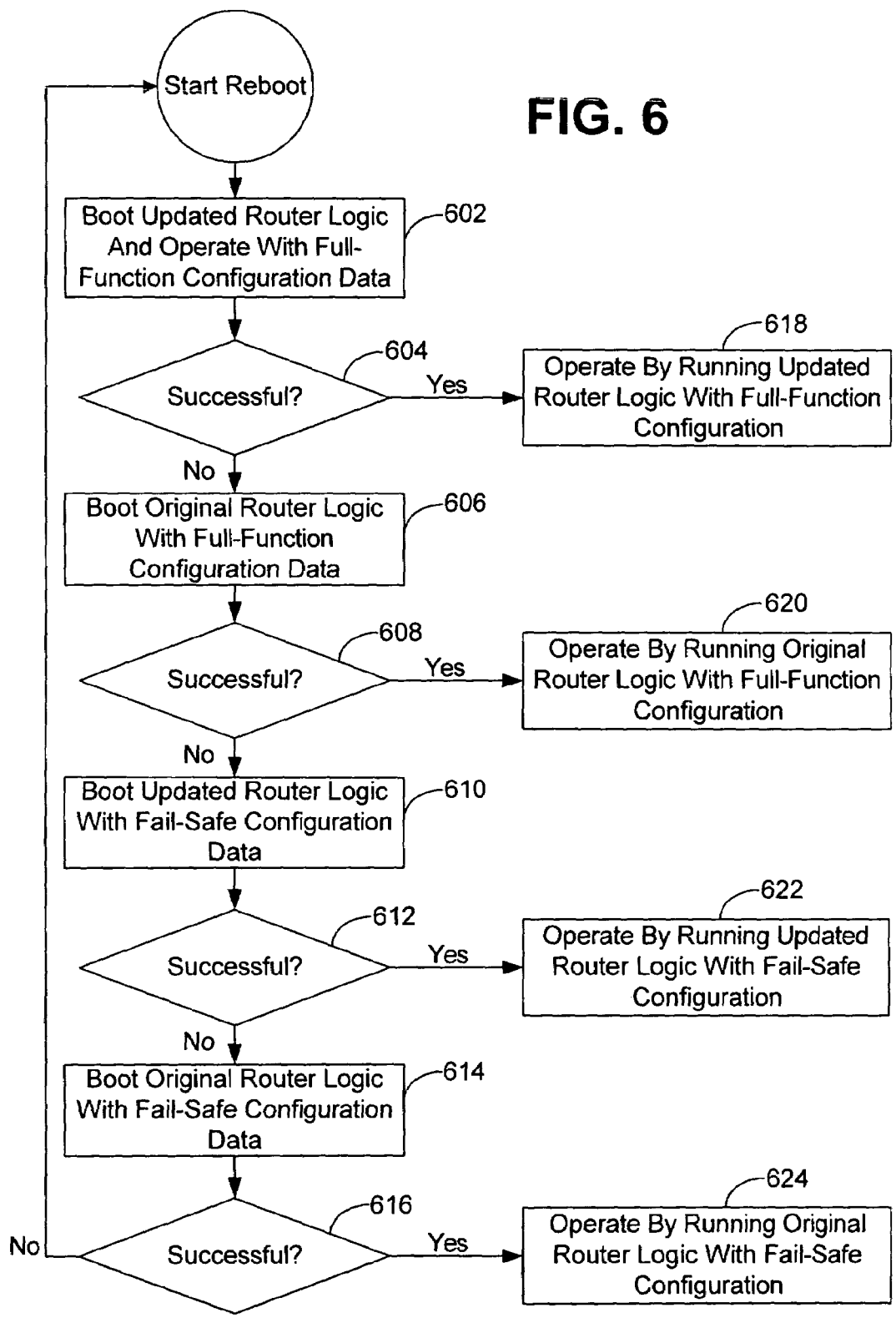
FIG. 6 is a flowchart illustrating a more detailed exemplary embodiment of a router system, such as is depicted in FIG. 3.

With reference to FIG. 6, the fail-safe boot logic 420 (FIG. 4) boots the updated router logic 424 as indicated in step 602. If boot of the updated router logic 424 is successful, as indicated in decision step 604, the router 400 (FIG. 4) operates by running updated router logic 424 with full-function configuration data 416 (FIG. 4), as indicated in step 618.

If, however, the boot of the updated router logic 424 is not successful, as indicated in decision step 604, the fail-safe boot logic 420 attempts to boot the original router logic 416 (FIG. 4), as indicated in step 606.

If boot of the original router logic 416 operating with the full-function configuration data 416 is successful, as indicated in step 608, then the router 400 operates as configured prior to receiving the update. In this regard, the router operates using the original router logic 416 with full-function configuration data 416 without the updated functionality of the updated router logic 424, as indicated in step 620.

If, however, the fail-safe boot logic 420 is not successful in booting the original router logic 416 operating, as indicated in step 608, then the fail-safe boot logic 420 attempts to boot the updated router logic 424 as indicated in step 610.

If the fail-safe boot logic 420 is successful in booting the updated router logic 424 operating with the fail-safe configuration data 422, as indicated in step 612, then the router 400 operates by running the updated router logic 424 operating with fail-safe configuration data 422, as indicated in step 622.

If the fail-safe boot logic 420 is not successful in booting the updated router logic 424 with the fail-safe configuration data 422, as indicated in step 612, then the fail-safe boot logic 420 attempts to boot the original router logic 416, and the original router logic 416 operates with the fail-safe configuration data 422, as indicated in step 614.

If the fail-safe boot logic 420 succeeds in booting the backup router logic 416, then the router 400 operates by running the original router logic 416 operating with the fail-safe configuration data 422, as indicated in step 624. If it is not successful, the fail-safe boot logic 420 begins the process again.

Now, therefore, the following is claimed:

1. A router comprising:
   first router logic configured to operate the router; and
   boot logic configured to receive updated router logic from a network and to perform a first reboot, the boot logic configured to initialize deactivation of the first router logic and initialize activation of the updated router logic during the first reboot such that a plurality of functions for the router are enabled during execution of the updated router logic, the boot logic configured to perform, in response to an error during execution of the updated router logic, a second reboot such that at least one of the functions is disabled based on the error.

2. The router of claim 1, wherein the error during execution is an operational failure.

3. The router of claim 2, further comprising a communication interface.

4. A router comprising:
   first router logic configured to operate the router;
   boot logic configured to initialize deactivation of the first router logic and initialize activation of updated router logic, if the updated router logic experiences an operational failure during execution; and
   a communication interface,
   wherein the boot logic is further configured to initialize activation of the updated router logic in conjunction with first configuration data, wherein the boot logic is configured to initialize activation of the first router logic in conjunction with the first configuration data if the updated router logic experiences the operational failure when executed with the first configuration data, and wherein the boot logic is further configured to initialize activation of the updated router logic in conjunction with the fail-safe configuration data if activation of the first router logic with the first configuration data produces the error.

5. The router as claimed in claim 4, wherein the communication interface is a dial-up modem.

6. A router comprising:
   first router logic configured to operate the router; and
   boot logic configured to initialize deactivation of the first router logic and initialize activation of updated router logic, if the updated router logic experiences an error during execution,
   wherein the updated router logic is configured to store, in memory, a data value indicative of a failure during execution of the updated router logic and wherein the boot logic is further configured to analyze the data value, the boot logic further configured to initialize activation of the first router logic in conjunction with first configuration data if the data value indicates that a previous failed execution occurred during execution of the updated router logic with the first configuration data.

7. The system of claim 6, wherein the boot logic is further configured to initialize activation of the updated router logic with fail-safe configuration data if the data value indicates that the previous failed execution occurred during execution of the first router logic with the first configuration data.

8. The system of claim 7, wherein the boot logic is configured to initialize activation of the original router logic with the fail-safe configuration data if the data value indicates that the previous failed execution occurred during execution of the updated router logic with the fail-safe configuration.

9. A router comprising:
   a communication interface;
   first router logic configured to perform routing operations via the communication interface;
   means for receiving, via the communication interface, updated router logic;
   means for activating the updated router logic in conjunction with first configuration data;
   means for activating the first router logic in conjunction with the first configuration data in response to an error associated with execution of the updated router logic; and means for activating the updated router logic in conjunction with fail-safe configuration data, if an error is detected during activation of the updated router logic in conjunction with the first configuration data.

10. The router as claimed in claim 9, further comprising a second communication interface.

11. The router as claimed in claim 10, wherein the second communication interface is a dial-up modem.

12. The system as claimed in claim 11, further comprising means for communicating with the router via the second communication interface from a remote management site if the update router logic is activated in conjunction with the fail-safe configuration data.

13. A medium capable of being read by a computer, the medium storing a computer program to be executed by a computer, the program comprising:
  logic for receiving updated router logic via a communication interface;
  logic for deactivating first router logic;
  logic for activating the updated router logic in conjunction with first configuration data;
  logic for activating the first router logic in conjunction with the first configuration data if the updated router logic experiences an error; and
  logic for activating the updated router logic in conjunction with fail-safe configuration data if the first router logic experiences an error.

14. A router update method comprising the steps of:
  receiving updated router logic via a communication interface;
  deactivating first router logic currently being executed;
  rebooting the router;
  activating the updated router logic in conjunction with first configuration data in response to the receiving step;
  activating the first router logic, in response to the rebooting step, in conjunction with the first configuration data, if the updated router logic experiences a first error; and
  activating the updated router logic in conjunction with fail-safe configuration data, in response to the rebooting step, if the first router logic experiences a second error with the first configuration data.

15. The method of claim 14 further comprising the step of activating the first router logic in conjunction with the fail-safe configuration data, if the updated router logic experiences a third error with the fail-safe configuration data.

16. The method of claim 15, wherein activating the first router logic in conjunction with the fail-safe configuration data enables a user access to the router remotely.

17. The method of claim 16, further comprising the step of:
  remotely determining a cause, by the user, for the first error.

18. The method of claim 17, wherein activating the updated router logic in conjunction with the fail-safe configuration enables a user access to the router remotely.

19. A method for use in a router, comprising the steps of:
  controlling routing operations in the router via first router logic;
  receiving, at the router, updated router logic from a network;
  activating the updated router logic in conjunction with first configuration data for enabling a plurality of functions for the router; and
  activating the updated router logic in conjunction with second configuration data in response to a detection of an error during operation of the router, the second configuration data for enabling only a subset of the functions such that at least one of the functions is disabled.

20. The method of claim 19, further comprising the step of activating the first router logic in conjunction with the first configuration data in response to an error associated with execution of the updated router logic.

21. The method of claim 19, further comprising the step of:
  rebooting the router in response to the error; and
  storing, prior to the rebooting, data indicating that the error occurred while the updated router logic in conjunction with first configuration data is activated, wherein the step of activating the updated router logic in conjunction with second configuration data is performed based on the data.

22. The method of claim 19, wherein the subset of the functions includes communicating with the network and the at least one function includes routing data packets.

23. The router of claim 1, wherein the boot logic is configured to initialize activation of the updated router logic in conjunction with first configuration data during the first reboot and to initialize activation of the updated router logic in conjunction with fail-safe configuration data during the second reboot.

24. The router of claim 23, wherein the boot logic is configured to initialize activation of the first router logic in response to an error detected during activation of the updated router logic.

25. The router of claim 1, wherein the boot logic is configured to store, prior to the second reboot, data indicative of which router logic is activated at the time of the error and to perform the second reboot based on the data.

26. The router of claim 1, wherein the boot logic is configured to perform the first reboot in response to the updated router logic.

27. The router of claim 1, wherein the boot logic is configured to initialize, during the second reboot, activation of the updated router logic such that communication with the network is enabled but routing of data packets by the router is disabled.

* * * * *